United States Patent

Fukuta

[11] Patent Number: 5,877,865
[45] Date of Patent: *Mar. 2, 1999

[54] IMAGE PROCESSING APPARATUS AND METHOD FOR PRINTING DATA DESCRIBED IN A PAGE DESCRIPTION LANGUAGE

[75] Inventor: Shigenori Fukuta, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 325,525

[22] Filed: Oct. 19, 1994

[30] Foreign Application Priority Data

Oct. 26, 1993 [JP] Japan .................................. 5-267099

[51] Int. Cl.$^6$ .............................. H04N 1/46; G03K 9/34
[52] U.S. Cl. .......................... 358/296; 358/501; 358/504; 395/105; 382/180
[58] Field of Search ..................................... 358/296, 401, 358/404–406, 444, 447, 448, 468, 471, 474, 486, 501, 504, 505; 347/3–5, 9; 395/101, 105, 109, 112, 114–117; 400/76, 582, 583, 583.4; 382/180

[56] References Cited

U.S. PATENT DOCUMENTS

| 4,510,506 | 4/1985 | Mariguchi et al. | 400/583.4 |
| 4,909,649 | 3/1990 | Okunomiya | 400/583.4 |
| 5,237,655 | 8/1993 | Statt et al. | 395/117 X |
| 5,471,322 | 11/1995 | Murata | 358/502 |
| 5,515,481 | 5/1996 | Pardo | 395/117 |

FOREIGN PATENT DOCUMENTS 61-195080  8/1986  Japan .

Primary Examiner—Peter S. Wong
Assistant Examiner—Gregory J. Toatley, Jr.
Attorney, Agent, or Firm—Fitzpatrick, Cella, Harper & Scinto

[57] ABSTRACT

An image processing apparatus which inputs PDL described print data from a host computer, interprets the print data to develop the data into bitmap image data, and transfers the bitmap image data to a serial printer. Upon transferring the bitmap image data, the apparatus determines whether or not image data corresponding to one scanning by a print head of the printer, i.e., one band, includes image data having a value "1" according to a dot to be printed. If the image data includes no "1" data, i.e., all data values are "0", the apparatus controls the printer to omit scanning by the print head at the band corresponding to the image data including no "1" data and feed the recording sheet for the band.

5 Claims, 16 Drawing Sheets

AFTER
BLACK-CHARACTER
PROCESSING

DATA X

| BIT | CONTENTS | CONTROL SIGNAL |
|---|---|---|
| 7 | 0 : PRINT<br>1 : NOT PRINT | MIX DATA |
| 6 | UNASSIGNED | |
| 5 | UNASSIGNED | |
| 4 | 0 : NOT INVERT DATA<br>1 : INVERT DATA | NEGA |
| 3 | 0 : EDGE EMPHASIS<br>1 : SMOOTHING | PHOTO |
| 2 | UNASSIGNED | |
| 1 | UNASSIGNED | |
| 0 | 0 : NO BLACK-CHARACTER PROCESSING<br>1 : BLACK-CHARACTER PROCESSING | KB |

FIG. 15

| KE0 | KE1 | KEBASE | (RL ≤ VDD1 ≤ RH) & (GL ≤ VDD2 ≤ GH) & (BL ≤ VDD3 ≤ BH) | JUDGMENT SIGNAL 755 |
|---|---|---|---|---|
| H | × | × | × | L |
| L | H | × | × | H |
| L | L | L | NO | L |
| L | L | L | YES | H |
| L | L | H | NO | H |
| L | L | H | YES | L |

IMAGE PROCESSING APPARATUS AND METHOD FOR PRINTING DATA DESCRIBED IN A PAGE DESCRIPTION LANGUAGE

BACKGROUND OF THE INVENTION

The invention relates to an image processing apparatus and method and, more particularly, to an image processing apparatus and method for inputting print data represented by PDL (page description language), converting the print data to image data, and outputting the image data to a printer and the like for printing.

Conventionally, PDL developing devices which input print data described in PDL language, interpret the PDL language to develop pattern data, and output the pattern-developed raster image data, are known. Further, systems where these devices are connected to a color copying machine and printer units of the copying machine are used for printing image data on a recording medium such as paper, have been introduced. Color copying devices which have a printer unit having a print head including an array of ink-jet nozzles, and which divide image data for one page into bands each corresponding to the print head width, for band unit printing by reciprocating the print head, have been introduced. Further, output devices which develop PDL-described print data for one band, corresponding to the above-mentioned printers for band unit printing, and at each development, output the developed data in band units, have been proposed.

However, the above conventional devices have the following drawbacks.

In a case where the color copying machine having a printer for band unit printing is connected to the PDL developing device for inputting PDL-described data and performing pattern development, the PDL developing device performs pattern-development of PDL-described print data and outputs patterns of image data and character data in page units. That is, the PDL developing device receives PDL language for one page, interprets the PDL language, then performs pattern development for one page, and outputs pattern data in band units to the printer. In this system, considerable time is required from the data reception to the completion of printing. Especially, when a large amount of PDL language data is received from a host computer, since data transfer further takes a long time, time required for printing (data transfer+pattern development+print output) is very long.

SUMMARY OF THE INVENTION

The present invention has been made in consideration of the above problems, and has its object to provide an image processing apparatus and method which omits printing of a portion of an image corresponding to developed image data of a predetermined unit if the image data of the predetermined unit has no dot data corresponding to dot(s) to be printed, so as to raise printing speed by a printer.

Another object of the present invention is to provide an image processing apparatus and method which omits print-scanning by a print head and merely shifts a recording medium to the next line if print data for the one print-scanning includes no dot data.

Further object of the present invention is to provide an image processing apparatus and method which pattern-develops PDL-described print data and performs printing efficiently.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 shows register values of respective operation modes of the image processing unit of the first embodiment;

DETAILED DESCRIPTION OF THE PREFERRED EMBODIMENT(S)

Preferred embodiments of the present invention will be described in detail in accordance with the accompanying drawings.

[First Embodiment]

Figure 1:
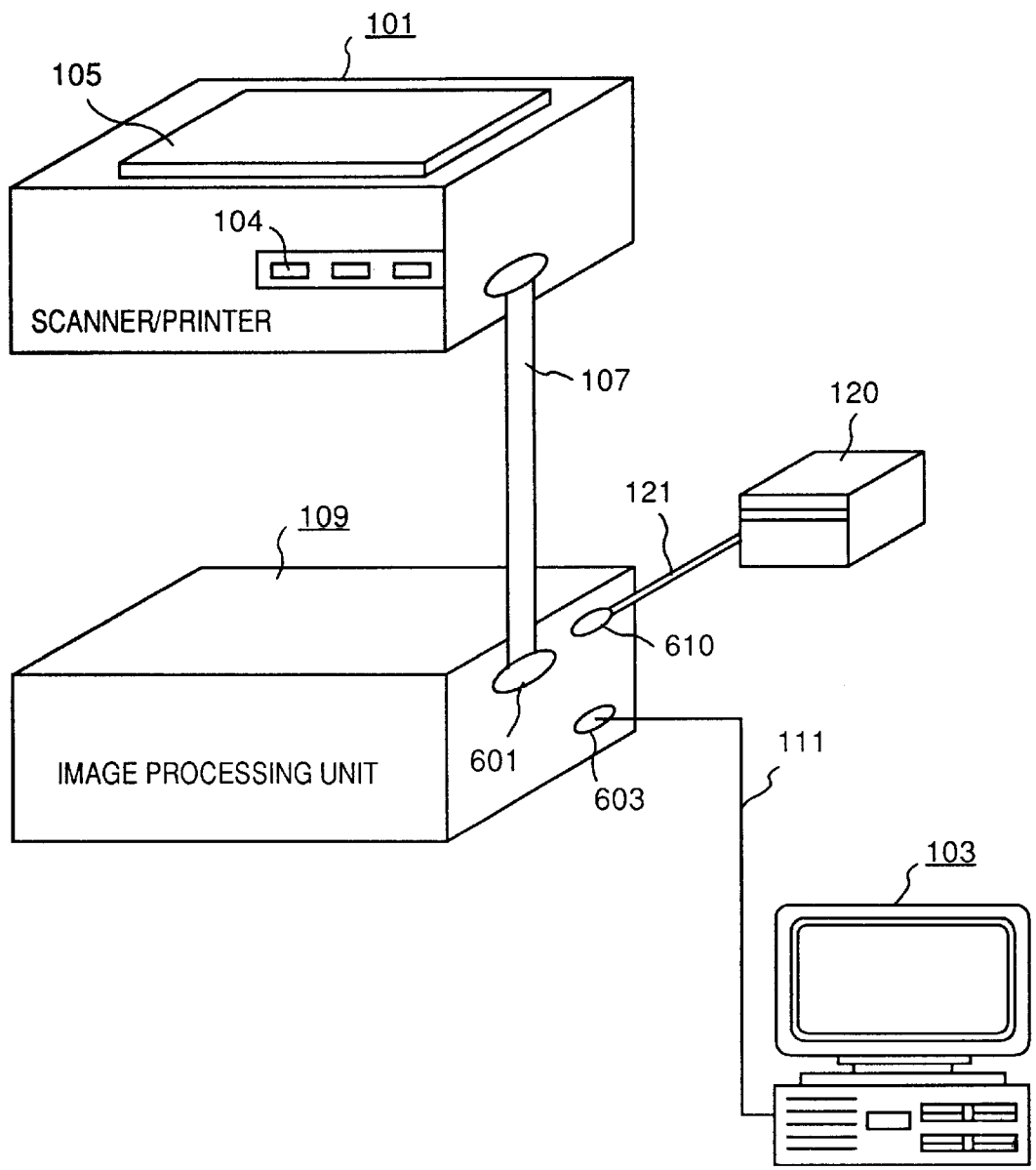
FIG. 1 is a block diagram showing the construction of an image forming system according to a first embodiment of the present invention.

FIG. 1 is a block diagram showing the construction of an image processing system according to a first embodiment of the present invention.

In FIG. 1, reference numeral 101 denotes a scanner/printer which includes, e.g., a color image scanner for performing photoelectric reading on an original image and outputting digital format data, and an ink-jet printer for inputting color image data and performing printing of a color image based on the input data. Numeral 109 denotes an image processing unit which is the significant portion of this image processing system. Note that the construction and operation of the image processing unit 109 will be described later. Numeral 103 denotes a host computer; and 120, a hard disk drive (HDD). The scanner/printer 101 and the image processing unit 109 are connected via a cable 107, and the HDD 120 and the image processing unit 109, via a cable 121.

As a copy start key 104 of the scanner/printer 101 is pressed, the color image scanner reads a color original image placed under a document cover 105, and the ink-jet printer may perform printing based on the read image data. At the same time, the image data read by the color image scanner can be transferred to the image processing unit 109 via the cable 107.

The image processing unit 109, to be described in detail later, receives PDL data transferred from the host computer 103 via a general purpose interface cable 111 comprising e.g. a centronics interface or the RS232C interface, develops the PDL data into raster image data and outputs the data to the scanner/printer 101. Thus, the scanner/printer 101 can be used for printing based on the PDL data from the host computer 103. Further, the image processing unit 109 can perform image processing on the raster image data developed from the input PDL data or image data transferred from the scanner/printer 101 before it outputs the raster image data or the received image data to the scanner/printer 101 for printing. Note that in FIG. 1, numeral 601, 603 and 610 denote connectors for connecting corresponding cables.

Figure 2:
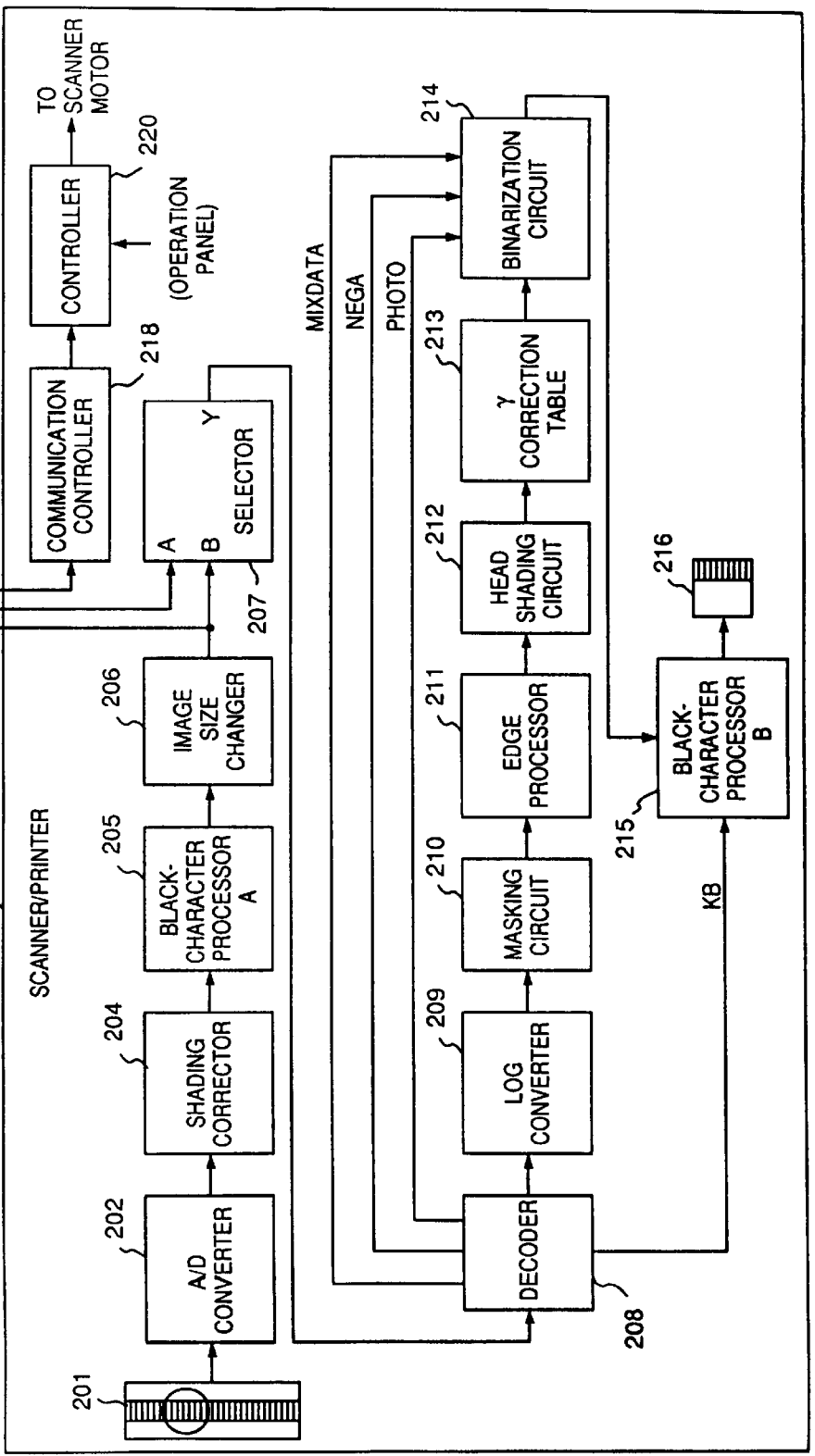
FIG. 2 is a block diagram showing the construction of a scanner/printer according to the first embodiment.
Figure 3:
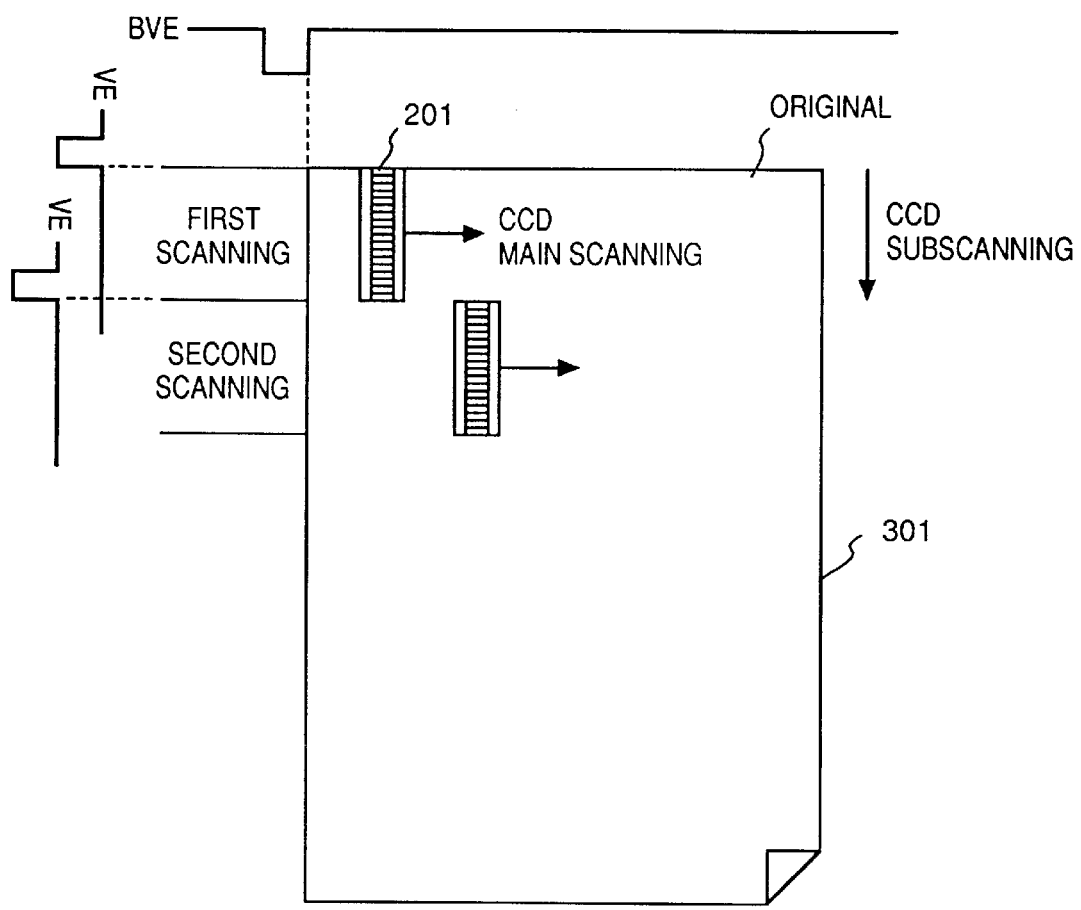
FIG. 3 illustrates scanning by a line sensor according to the first embodiment.
Figure 4A:
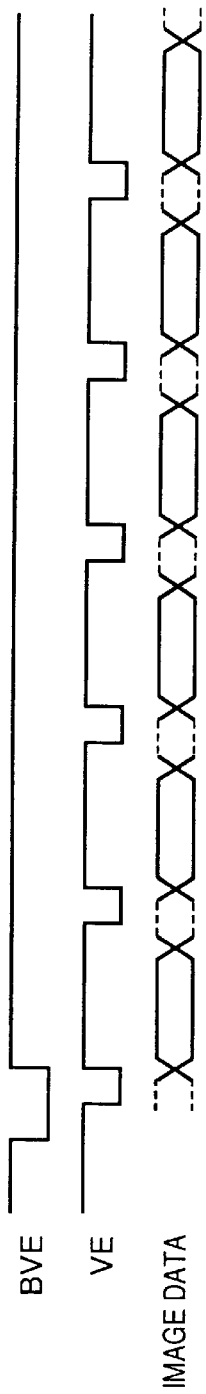
FIGS. 4A to 4C are timing charts showing the operation timing of the scanner/printer of the first embodiment.
Figure 4B:
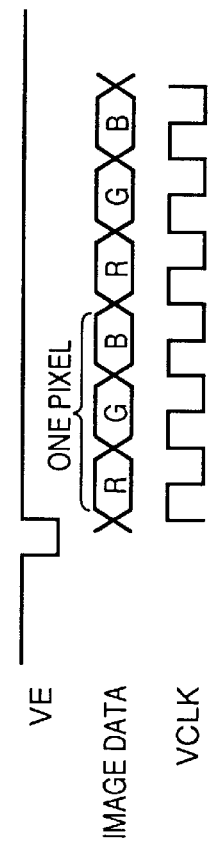
Figure 4C:
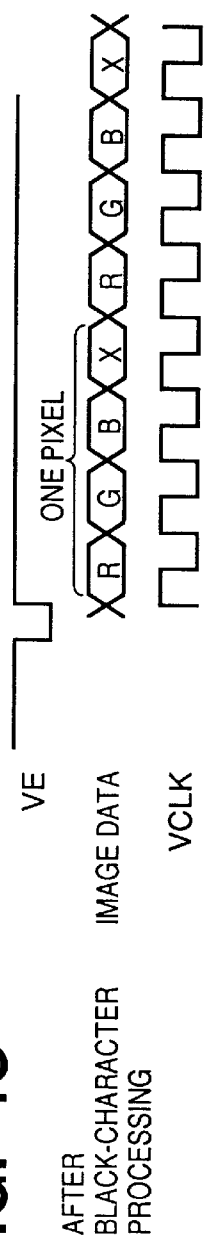
Figures 5, 6:
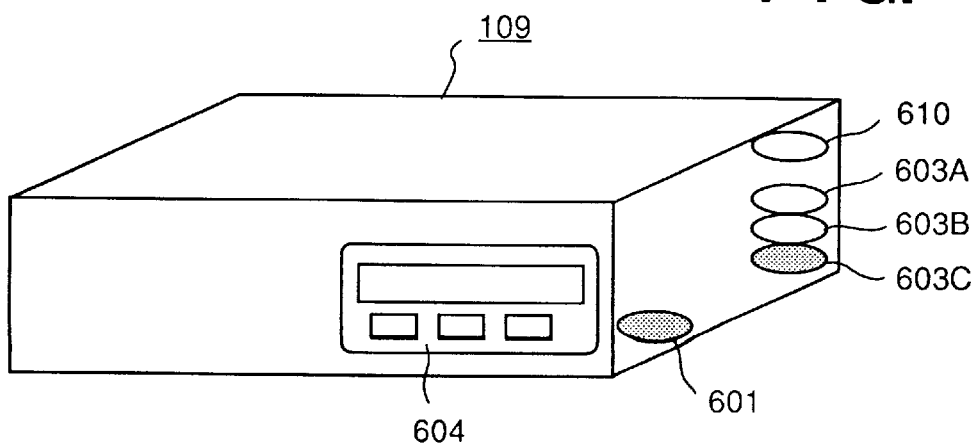
FIG. 5 illustrates the contents of data X added by black-character processor according to the first embodiment.
FIG. 6 is a perspective view of an image processing unit according to the first embodiment.

FIG. 2 is a block diagram showing the construction of the scanner/printer 101 of the present embodiment. FIG. 3 shows scanning of the original by a line sensor 201 of the color scanner. FIG. 4 is a timing chart showing the operation timing of the scanner/printer 101. FIG. 5 shows the contents of data X added by a black-character processor A 205.

In FIG. 2, the line sensor 201, comprising, e.g., a CCD, has sensors arrayed in the order of R, G, B, R, G, B, ... , in accordance with the respective colors, in a main-scanning direction, and R, G and B sensors in one set are corresponding to one pixel.

As shown in FIG. 3, the line sensor 201 sequentially performs scanning in the horizontal direction as main-scanning and scanning in the vertical direction as subscanning on the original 301. That is, the line sensor 201 starts read-scanning on the overall original, in synchronization with, e.g., the rising edge of a signal BVE as shown in FIGS. 3 and 4A, and continues scanning on the original in band units such as the first scanning, the second scanning, ... in the main-scanning direction, in synchronization with, e.g., the rising edge of a signal VE as shown in FIGS. 3 and 4A. The read image signal of the respective colors forms one-pixel data in, e.g., three clocks of a video clock VCLK in FIG. 4B showing the rising edge of the video clock VCLK, and is transferred in synchronization with the clock VCLK. Note that the line sensor 201 is driven by, e.g., a stepping motor (not shown), for scanning an arbitrary area of the original under the control of a controller (not shown).

In FIG. 2, numeral 202 denotes an A/D converter for converting the analog image signal outputted from the line sensor 201 into digital image data; 204, a shading corrector for performing white-correction/black-correction on the digital image data inputted from the A/D converter 202 in accordance with the characteristic of the line sensor 201; and 205, a black-character processor A for detecting black characters included in the original image from the image data inputted from the shading corrector 204, and performing processing to eliminate blur upon printing and edge emphasis processing upon the detected black characters. The black-character processor A 205 forms one-pixel data in, e.g., four clocks of the video clock VCLK as shown in FIG. 4C, and outputs the image data in synchronization with the video clock VCLK. That is, the black-character processor A 205 adds data X as shown in FIG. 5 to each pixel of the input image data. For example, the black-character processor A 205 sets the "0" bit of the data X regarding a pixel to be subjected to black-character processing to "1", while sets the "0" bit of the data X regarding a pixel not to be subjected to the black-character processing to "0". Note that the data X is an 8-bit data where each bit includes control information as shown in FIG. 5.

In FIG. 2, numeral 206 denotes an image size changer for enlarging (or reducing) the size of the image data inputted from the black-character processor A 205 to an arbitrary size. As described above, the image data outputted from the image size changer 206 is transferred to the image processing unit 109 via the cable 107, and the data is also transferred to a selector 207. The selector 207 selects the image data inputted from the image processing unit 109 via the cable 107 or the image data inputted from the image size changer 206 and outputs the selected data. That is, if the selector 207 selects the image data from the image size changer 206, the scanner/printer 101 operates independently and performs copying of the read color image.

Numeral 208 denotes a decoder for decoding the data X included in the image data inputted from the selector 207. That is, the decoder 208 outputs the control signal as shown in FIG. 5 to a binarization circuit 214 to be described later or a black-character processor B 215 in accordance with the data X included in the image data. Numeral 209 denotes a LOG converter for converting the RGB image data inputted from the decoder 208 into, e.g., CMYK image data. Numeral 210 denotes a masking circuit for performing masking processing in accordance with ink characteristic on the image data inputted from the LOG converter 209. Note that when the scanner/printer 101 operates independently, a controller (not shown) sets a coefficient in the masking circuit 210 in consideration of both input masking and output masking. Upon processing image data from an external unit such as the image processing unit 109, the controller (not shown) sets a coefficient in the masking circuit 210 in consideration of output masking.

Numeral 211 denotes an edge processor for performing edge-emphasis on the image data inputted from the masking circuit 210; 212, a head shading circuit for performing processing on the image data inputted from the edge processor 211 for correcting the unevenness of ink discharging amount and ink discharging direction of a print head 216 to be described later; 213, a γ correction table for converting the image data inputted from the head shading circuit 212 to data of a desired printing density; 214, a binarization circuit for converting the multi-level image data inputted from the γ correction table 213 to binary image data based on control signal such as MIXDATA, NEGA and PHOTO from the decoder 208; and 215, a black-character processor B for performing black-character processing on the image data inputted from the binarization circuit 214 based on a control signal KB from the decoder 208.

Numeral 216 denotes a print head for performing printing an image on a recording sheet based on the image data inputted from the black-character processor B 215. Note that the operation timing of the print head 216 is in synchronization with the aforementioned signals BVE and VE for printing images in band units. As the construction and principle of the ink-jet printing are well-known, the detailed explanation of the construction and principle will be omitted. Briefly, the ink-jet printing is made in the following manner. That is, in accordance with printing information, a driving signal is given to cause rapid temperature rise to exceed the ink-boiling point at ink-containing sheet or a heater provided in an ink path nozzle, then bubbles are formed on the heat effecting surface of the heater. The expansion and compression of the bubbles discharge ink droplets from nozzles toward a recording sheet via discharging orifices, to print an image on the recording sheet.

Numeral 218 denotes a communication controller for transmission of various commands between the scanner/printer 101 and the external unit such as the image processing unit 109; and 220, a controller for controlling the operation of the scanner and the printer in accordance with instructions from the communication controller 218 or an operation panel (not shown) of the scanner/printer. As described later, in the present embodiment, upon processing of memory control, the scanner/printer 101 performs reading for one band shown in FIG. 3 at each image data development for one band.

Next, the image processing unit 109 will be described detailed below.

FIG. 6 is a perspective view of the image processing unit 109.

In FIG. 6, numeral 601 denotes a connector combined with the cable 107 connecting the image processing unit 109 to the scanner/printer 101; 603 (603A to 603C), connectors combined with the cable 111 connecting the image processing unit 109 to the host computer 103. In this embodiment, the connectors 603 includes connectors 603A, 603B and 603C respectively used as a serial I/F connector, a parallel I/F connector and a LAN connector. Numeral 610 denotes a connector for an external HDD 120. The external HDD 120 is not an absolute requirement, however, as it may be used for additional font data storage. Numeral 604 denotes an operation panel having keys for setting the status of the image processing unit 109, an LCD (liquid crystal display) panel and LED (light emitting diode) for displaying the status of the unit 109.

Figure 7:
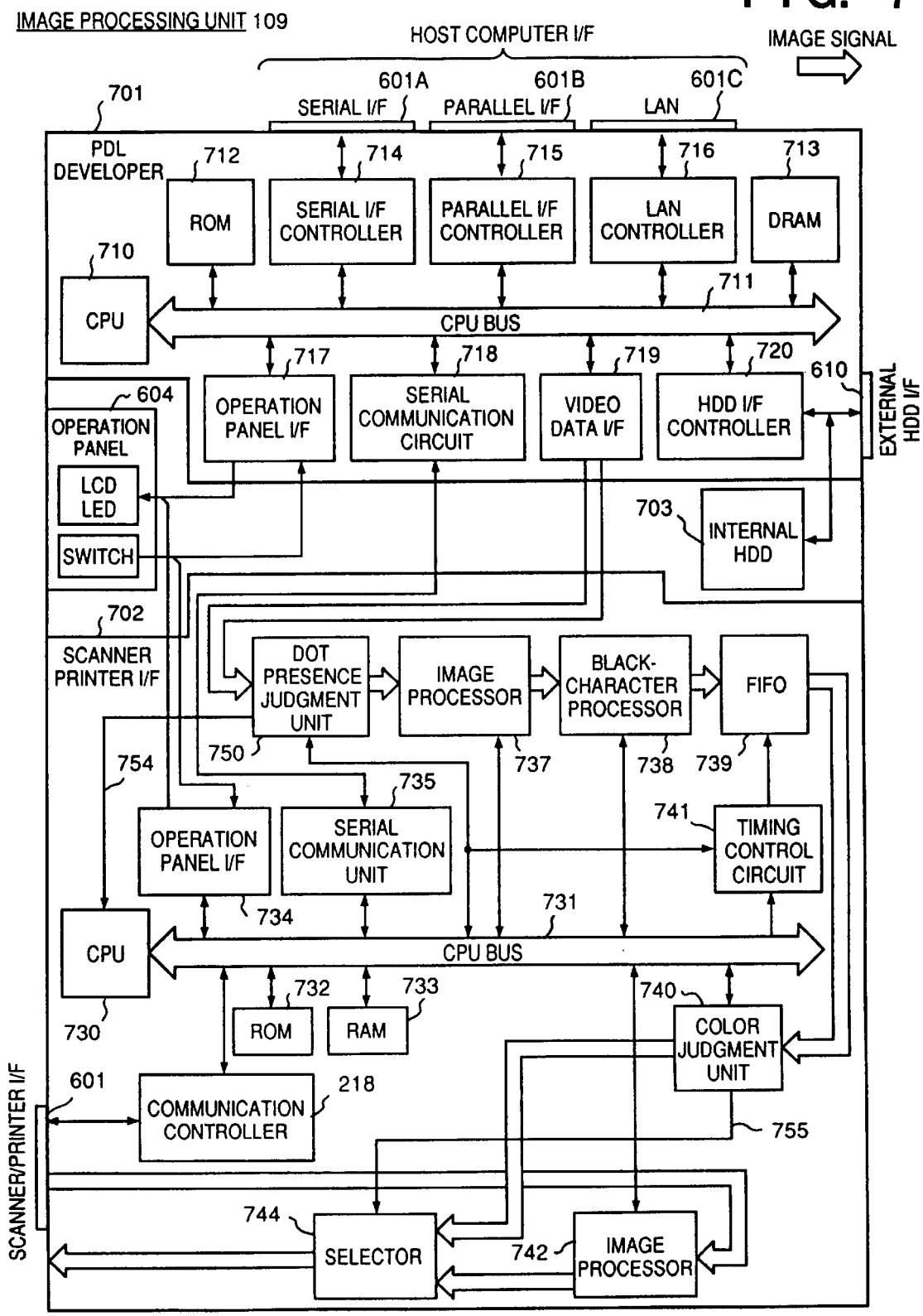
FIG. 7 is a block diagram showing the construction of the image processing unit of the first embodiment.

FIG. 7 is a block diagram showing the construction of the image processing unit 109 of the present embodiment.

Figure 8:
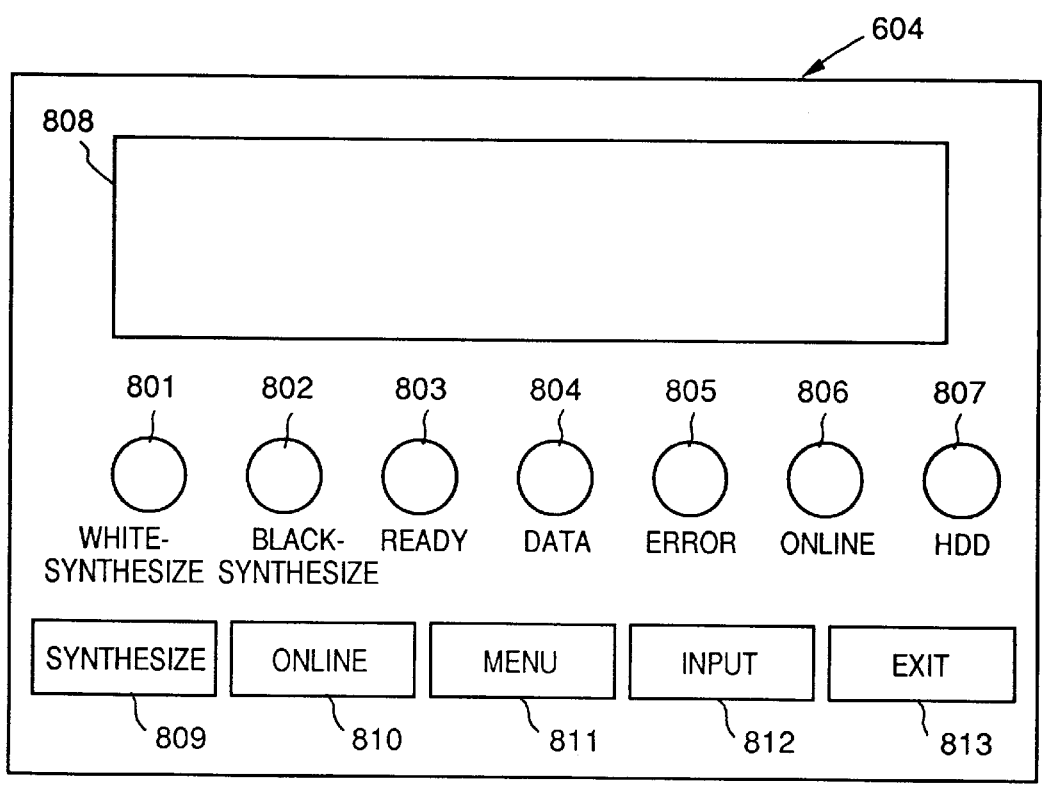
FIG. 8 illustrates the construction of an operation panel of the image processing unit of the first embodiment.

The image processing unit 109 is divided into four portions; a PDL developer 701, a scanner/printer I/F 702, an internal HDD 703 and the operation panel 604. the internal HDD 703 is used for storing KANJI (Chinese character) font data and the like. When KANJI output is not performed or the PDL developer 701 can develop image data using a ROM 712 and a DRAM 713, the internal HDD 703 can be omitted. As shown in FIG. 8, the operation panel 604 comprises a display LCD 808, LED's 801 to 807 and input switches 809 to 813. The LCD 808 displays operation statuses, such as PDL development, as English messages. The LED's 801 and 802 are respectively turned on when the current mode is a white-synthesizing mode (801) or a black-synthesizing mode (802). The LED 803 is turned on when the image processing unit 109 is able to receive PDL data from the host computer 103. The LED 804 is turned on and off while the image processing unit 109 performs data processing such as PDL data development. The LED 805 is turned on and off when the image processing unit 109 is in some error status. The LED 806 is turned on when the image processing unit 109 is in online status. The LED 807 is turned on while the internal HDD 703 is accessed.

The synthesizing switch 809 is used for ON/OFF changing of a synthesizing mode; and the online switch 810, for online/offline state changing. The menu switch 811 is used for setting the current mode to a menu setting mode when the current status is the offline status. In the menu setting mode, the menu switch 811 has a function for changing menu items. The enter (input) switch 812 has a function for selecting the menu items. The exit switch 813 is used for instructing returning the current menu level to a one-level lower level.

In the operation panel 604, the LED's 801 and 802, and the synthesizing switch 809 are controlled by a CPU 730 of the scanner/printer I/F 702, and the LED's 803 to 807, the LCD 808 and the switches 810 to 813 are controlled by a CPU 710 of the PDL developer 701.

Next, the construction of the PDL developer 701 will be described below.

In FIG. 7, the CPU 710 controls the overall PDL developer 701 via a CPU bus 711 based on programs stored in the ROM 712. The CPU 710 comprises a high-speed processing CPU, e.g., the RISC CPU, for performing heavily-loaded processing such as PDL data development. Numerals 714 to 716 respectively denote a serial I/F controller, a parallel I/F controller and a LAN controller, to perform PDL data reception via the connector 601A to 601C from the host computer 103. The received PDL data is stored into an area of the DRAM 713 via the CPU bus 711. The CPU 710 interprets the PDL data stored in the area of the DRAM 713 to develop the data into raster image data using font data and the like stored in the ROM 712, the internal HDD 703 or the external HDD 120, and stores the image data into a specific area of the DRAM 713.

This PDL data development to raster image data is made in raster image units corresponding to the bands dividing one page. This corresponds to the output characteristic of the scanner/printer 101. That is, printing by the scanner/printer 101 cannot be stopped while one band is printed, however, the printing can be stopped at the interval between the bands. If the PDL data is developed in band units, then the DRAM 713 does not need storage area for storing image data for one page, but needs only a storage area for one band.

The CPU 710 develops the data for one band, then transfers the raster image data to the scanner/printer I/F 702 using a video data I/F 719. When the data transfer for one band has been completed, again the CPU 710 reads the PDL data in the DRAM 713 to develop the data into raster image data for the next band, stores the raster image data into the DRAM 713, and transfers the data to the scanner/printer I/F 702. The CPU 710 repeats the above operation for each band in one page, to perform printing based on the raster image data for one page by the scanner/printer 101. The CPU 710 controls the display and switch input at the operation panel 604 via an operation panel I/F 717. Further, the CPU 710 communicates with the scanner/printer I/F 702 using a serial communication circuit 718.

Next, the construction of the scanner/printer I/F 702 will be described. Similar to FIG. 4C, the image signal to be described below comprises an 8-bit image data, a synchronizing clock VCLK, a line synchronizing signal VE and a band synchronizing signal BVE.

A CPU 730 controls the overall scanner/printer I/F 702 via a CPU bus 731 based on control programs stored in a ROM 732. As the CPU 730 is used for controlling the operation of the scanner/printer 101, setting of respective image processing circuits and the like, it does not need a processing speed as high as that of the CPU 710 of the PDL developer 701. A RAM 733 is a memory used as a work area.

The CPU 730 controls the output at the operation panel 604 and input processing from the switches of the operation panel 604 using an operation panel I/F 734. A dot presence judgment unit 750 judges whether or not there is dot data (data corresponding to dot(s) to be printed) with respect to raster image data for one band from the PDL developer 701.

Figure 9:
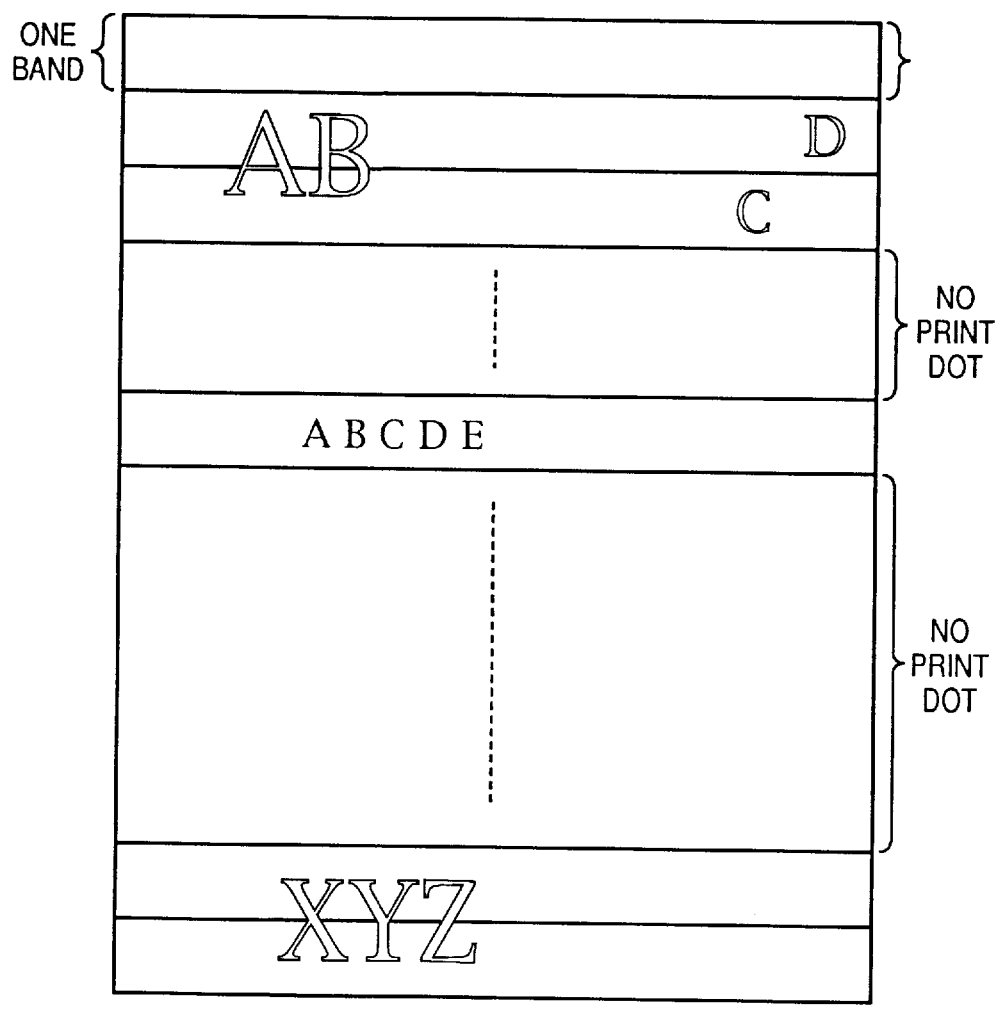
FIG. 9 is an explanatory view of band unit printing according to the first embodiment.

The dot presence judgment will be explained with reference to FIG. 9. As shown in FIG. 9, whether or not the band-unit image data from the PDL developer 701 includes dot data is determined. Print data determined as including no dot data corresponds to white (blank) image data. That is, if (R, G, B)=(FF, FF, FF), the dot presence judgment unit 750 determines that there is no dot data.

Figure 10:
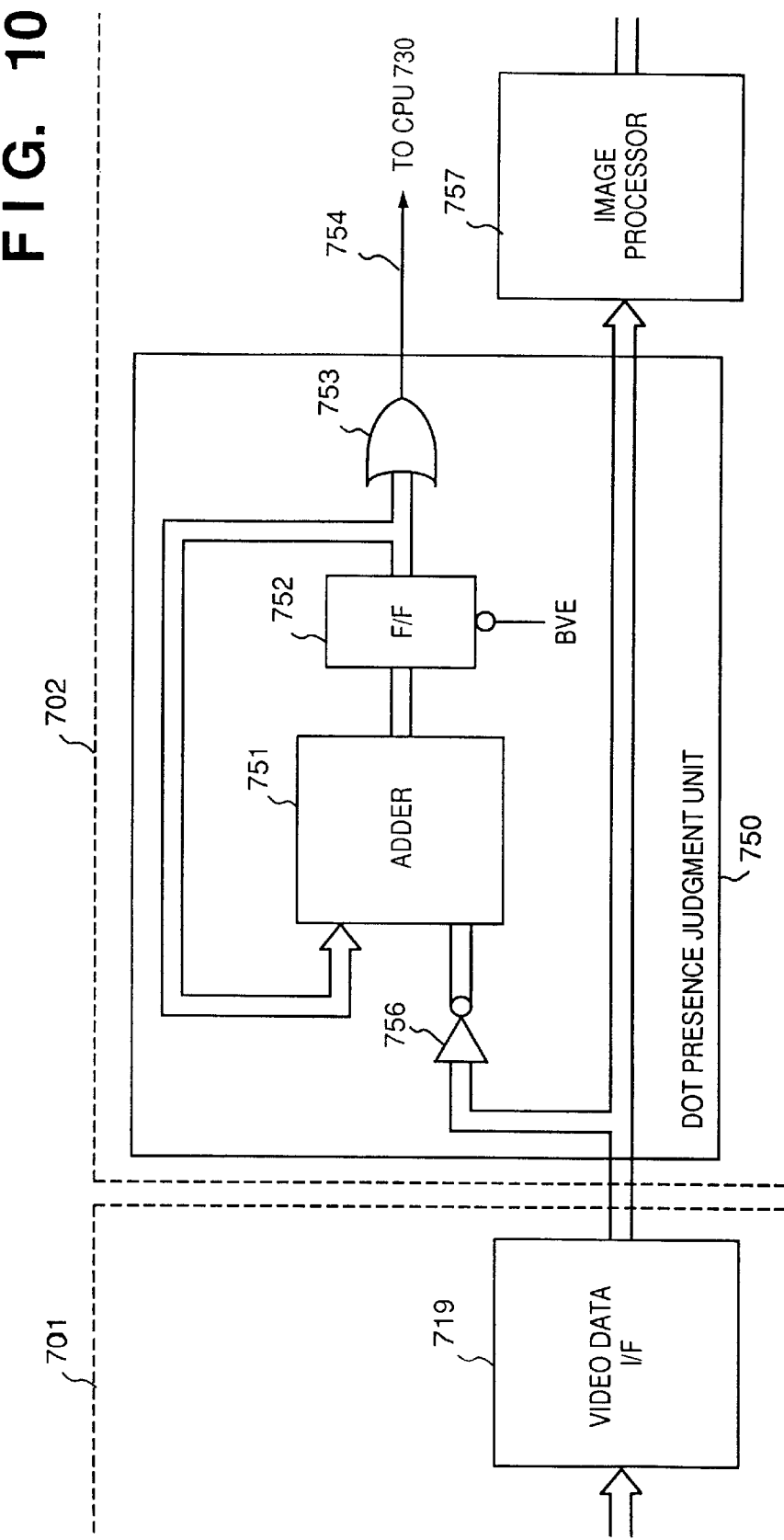
FIG. 10 is a block diagram showing the construction of a dot presence judgment unit according to the first embodiment.

FIG. 10 is a block diagram showing the construction of the dot presence judgment unit 750.

In FIG. 10, an inverter 756 of the dot presence judgment unit 750 inverses image data outputted from a video data I/F 719, and an adder 751 and D-flip-flop 752 repeat addition {(R1+G1+B1)+(R2+G2+B2)+(R3+G3+B3) . . . } in band units. The added result is passed through an OR gate 753. The output from the OR gate 753 enters the CPU 730, which determines whether or not the data for one band includes dot data based on a signal 754 indicative of the added result. That is, if the added value includes "1", it is determined that the data for one band includes dot data. In this case, normal printing processing performed.

On the other hand, if the added value is "0", the CPU 730 determines that the one band data includes no dot data, and stores image data into a FIFO memory 739 so that upon printing, printing process for a band corresponding to the band data, determined as including no dot data, is not performed through the printing cycle. Paper feeding is performed without printing operation at this band portion corresponding to the band data which contains no dot data.

As described above, regarding the image data transferred from the PDL developer 701, presence/absence of dot data is judged in band units, and at the same time, an image processor 737 performs color tone adjustment. More specifically, the image processor 737 performs 3×3 matrix calculation on the image data where each pixel is represented by 8-bit R, G and B data, or performs γ correction using a look-up table (LUT) on the image data.

A black-character processor 738 is similar to the black-character processor A 205 (FIG. 2). That is, the black-character processor 738 examines image data (RGB) including the neighboring pixels of a pixel of interest, and as described in FIG. 5, sets the "0" bit of the data X in a black edge portion to "0" (no black-character processing). As a result, the black-character processor B 215 (FIG. 2) of the scanner/printer 101 operates so that the only black color ink is discharged, to obtain clear outline of a black character.

The output from the black-character processor 738 is stored into the FIFO memory 739. This memory 739 is used for buffering image data so as to be synchronized with the operation timing of the scanner/printer 101 and is controlled by a timing control circuit 741. This timing control includes reading/writing of image data from/to the FIFO memory 739. An output image signal from the FIFO memory 739 enters a color judgment unit 740. Though described in detail later, the color judgment unit 740 judges whether or not the input image data has a pre-set color in pixel unit, and outputs one-bit judgment signal 755 to a selector 744.

The image signal from the color judgment unit 740 enters the scanner/printer 101 via the selector 744. On the other hand, an image processor 742 performs masking calculation (3×3 calculation on RGB data) and the like on the image signal, obtained from scanning on the original under the document cover 105 of the scanner/printer 101, and inputs the processed image signal into the selector 744. The selector 744 is controlled in one-pixel unit based on the judgment signal 755 outputted from the color judgment unit 740. In this manner, the selector 744 selects the image data which has been masking-calculated by the image processor 742 or the image data processed by the black-character processor 738 and outputs the selected data. Note that the handshake between the series of operations of the PDL developer 701 and the scanner/printer I/F 702 is made by communication between the CPU 710 and the CPU 730 based on a predetermined protocol using serial communication circuits 718 and 735.

Figure 11:
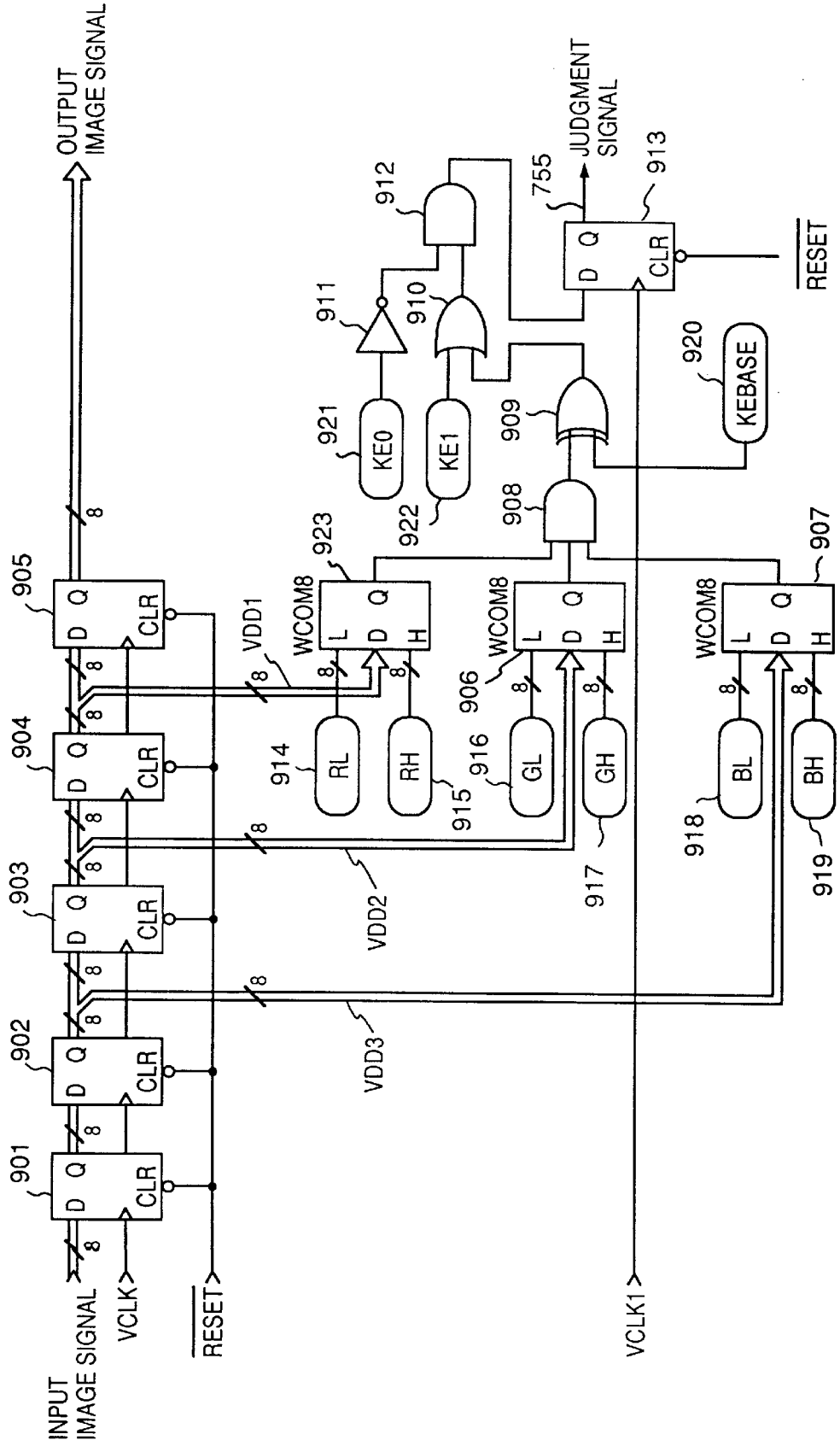
FIG. 11 is a block diagram showing the construction of a color judgment unit of the image processing unit of the first embodiment.

FIG. 11 show the construction of the color judgment unit 740.

Figure 13:
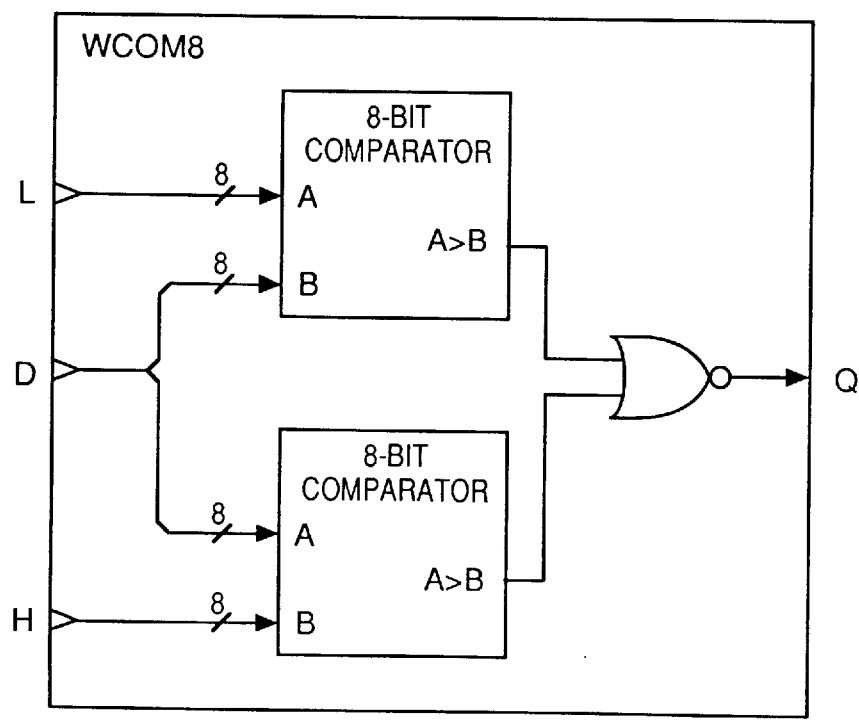
FIG. 13 illustrates the construction of a window comparator.

An input image signal is latched by flip-flops 901 to 905 in synchronization with the image clock signal VCLK, and the image signal on the half way is inputted into window comparators WCOM 8 (906, 907 and 923). The window comparator WCOM 8 has 8-bit width input terminals L, D and H. Only if L≦D and D ≦H, the level of one-bit output Q of this circuit becomes high. FIG. 13 shows the construction of the WCOM 8.

In the window comparators (WCOM 8) 906, 907 and 923, the L-input terminal and the H-input terminal are connected to registers 914 to 919 which contain output data mapped in the memory space of the CPU 730, through latches (not shown). The CPU 730 writes desired values into the memory space to set the desired values into the desired register. An AND gate 908 inputs comparison results from comparison of the respective register values with the image signal value by the window comparators 906, 907 and 923. The AND gate 908 outputs the data into a flip-flop 913 via gates 909, 910 and 912, and the flip-flop 913 latches the data in synchronization with a clock signal VCLK1. Thus, the judgment signal 755 is outputted in one-pixel units.

Figure 12:
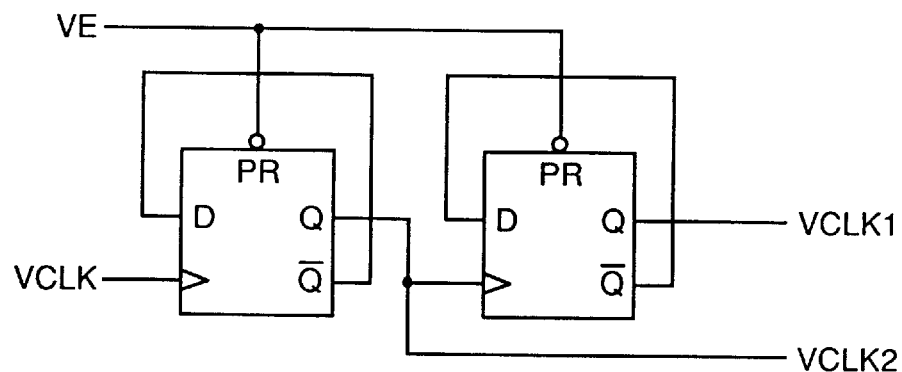
FIG. 12 illustrates output circuits of image clocks VCLK1 and VCLK2.

As shown in FIG. 12, the clock signal VCLK1 is a clock signal having one-pixel period made of the VE signal and the VCLK signal. The gates 909, 910 and 912 control the judgment signal 755 in accordance with the set values of registers 920 to 922. Thus, the color judgment unit 740 outputs the judgment signal 755 having characteristics as shown in FIG. 15.

Figure 14:
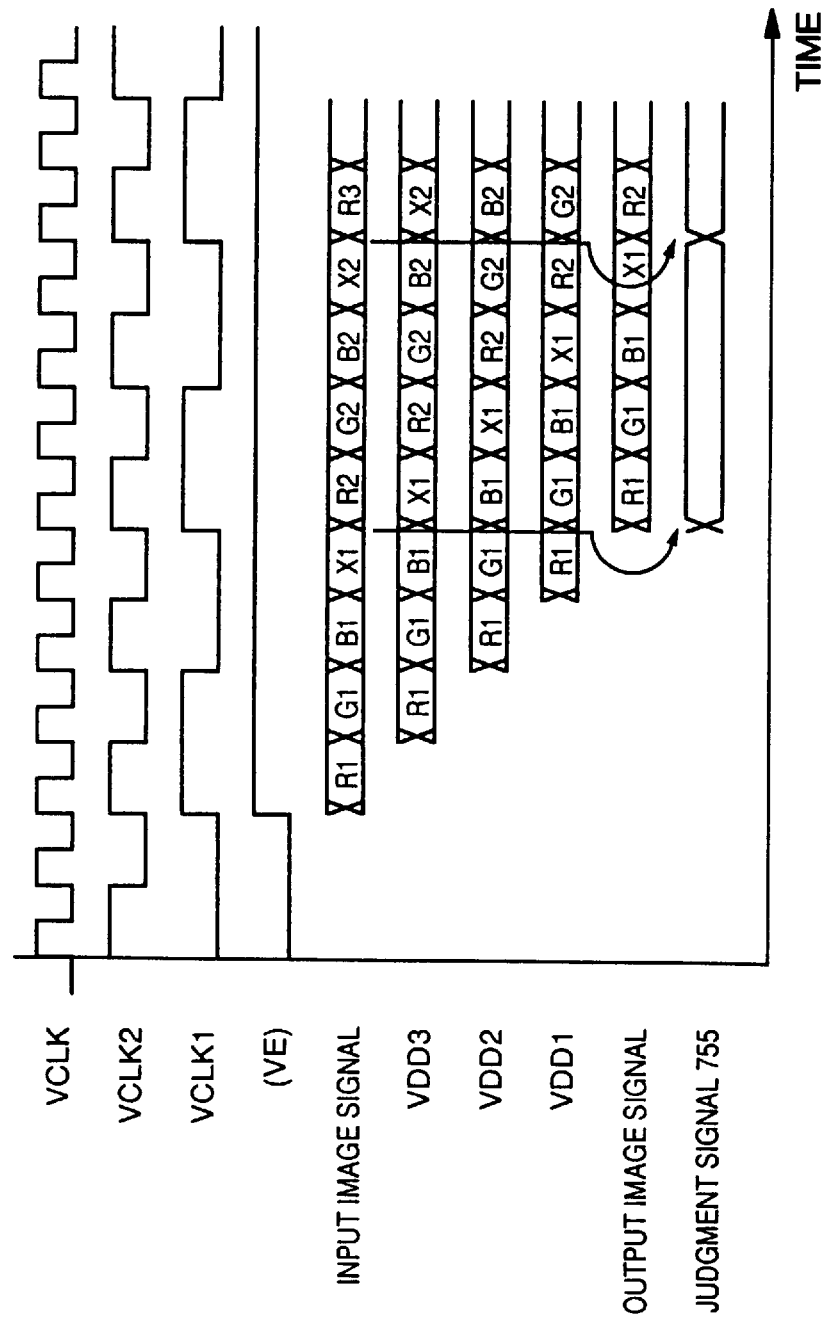
FIG. 14 is a timing chart showing the operation timing of the color judgment unit of the image processing unit of the first embodiment.

That is, the RGB data of the input image signal is compared with the values of the registers RL 914, RH 915, GL 916, GH 917, BL 918 and BH 919, and the level of the judgment signal 755 is determined in accordance with whether or not the R-data (VDD1) resides between RL and RH, G-data (VDD2) resides between GL and GH, and the B-data resides between BL and BH, otherwise, whether or not even one of the R-, G-, B-data does not reside between the corresponding value range. A register KEBASE 920 can select one of the determinations to set the level of the judgment signal 755 to high. Registers KE0 (921), KE1 (922) can forcibly set the judgment signal level to high or low. FIG. 14 shows the timings of the respective elements of the color judgment unit 740.

Figure 16:
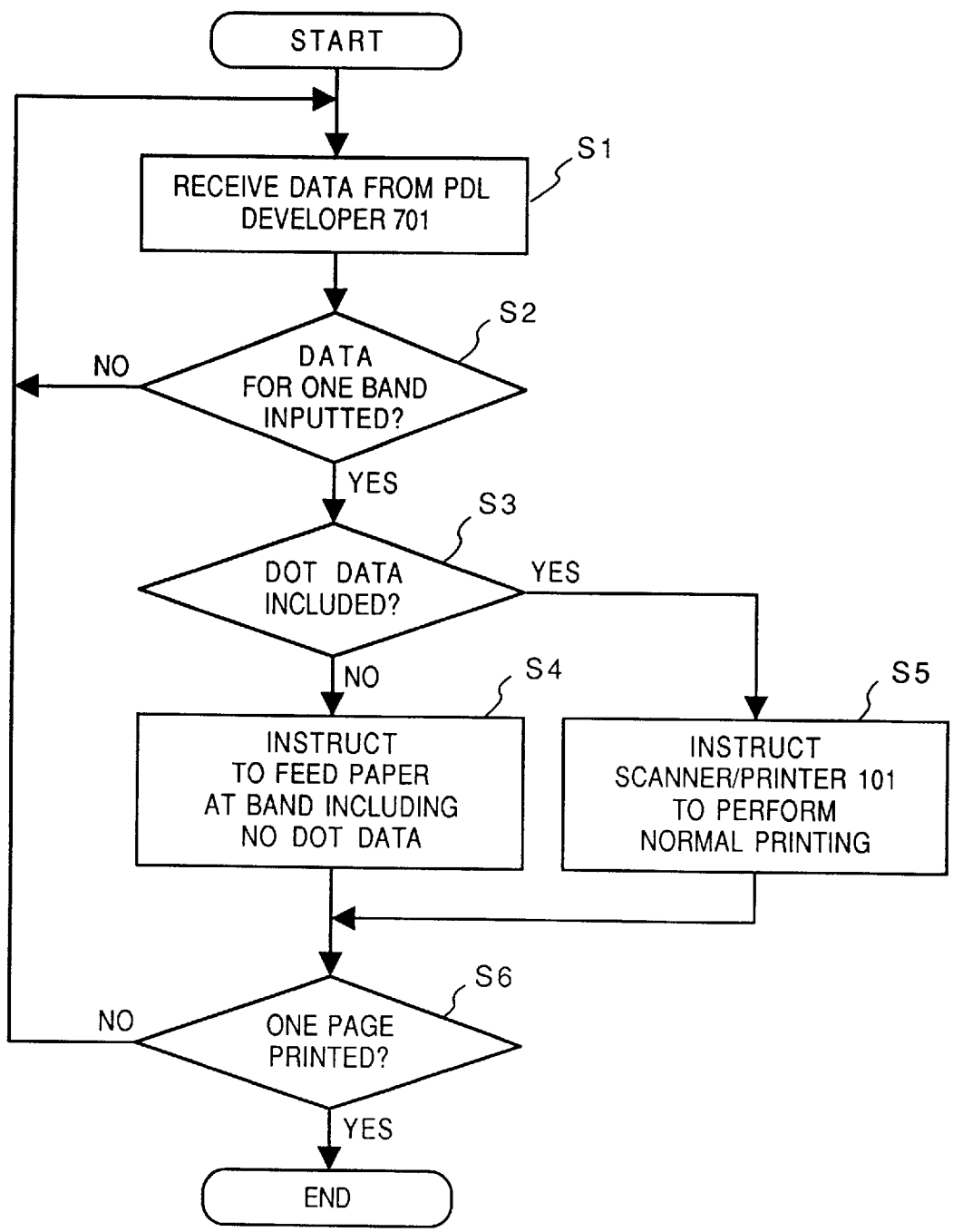
FIG. 16 is a flowchart showing printing processing for one page by a CPU of a scanner/printer interface.

FIG. 16 is a flowchart showing print control for printing for one page by the CPU 730 of the scanner/printer interface 702 according to the present embodiment. The control program for executing this processing is stored in the ROM 732.

This processing starts upon reception of print data, developed as raster image print data from PDL language, transferred from the PDL developer 701. In step S1, the image-developed print data is received and stored into the FIFO memory 739. At this time, the dot presence judgment unit 750 determines whether or not the image data includes dot data. In step S2, as print data for one scan-printing (one band) by the print head 216 of the scanner/printer 101 has been received, the process proceeds to step S3 in which whether or not the print data for one band includes dot data is determined in accordance with the signal 755 from the dot presence judgment unit 750.

If YES, the process proceeds to step S5 in which the print data is outputted to the scanner/printer 101, and an instruction to perform normal printing is issued to the scanner/printer 101. On the other hand, if NO, the process proceeds to step S4 in which an instruction to omit printing where the band corresponding the one-band print data including no dot data and to feed the paper for the band, is issued to the scanner/printer 101. At the same time, an instruction to invalidate the one-band print data all "0" stored in the FIFO memory 739 is issued to the timing control circuit 741. Then the process proceeds to step S6, to repeat the above operations until the printing for one page is completed.

[Second Embodiment]

Figure 17:
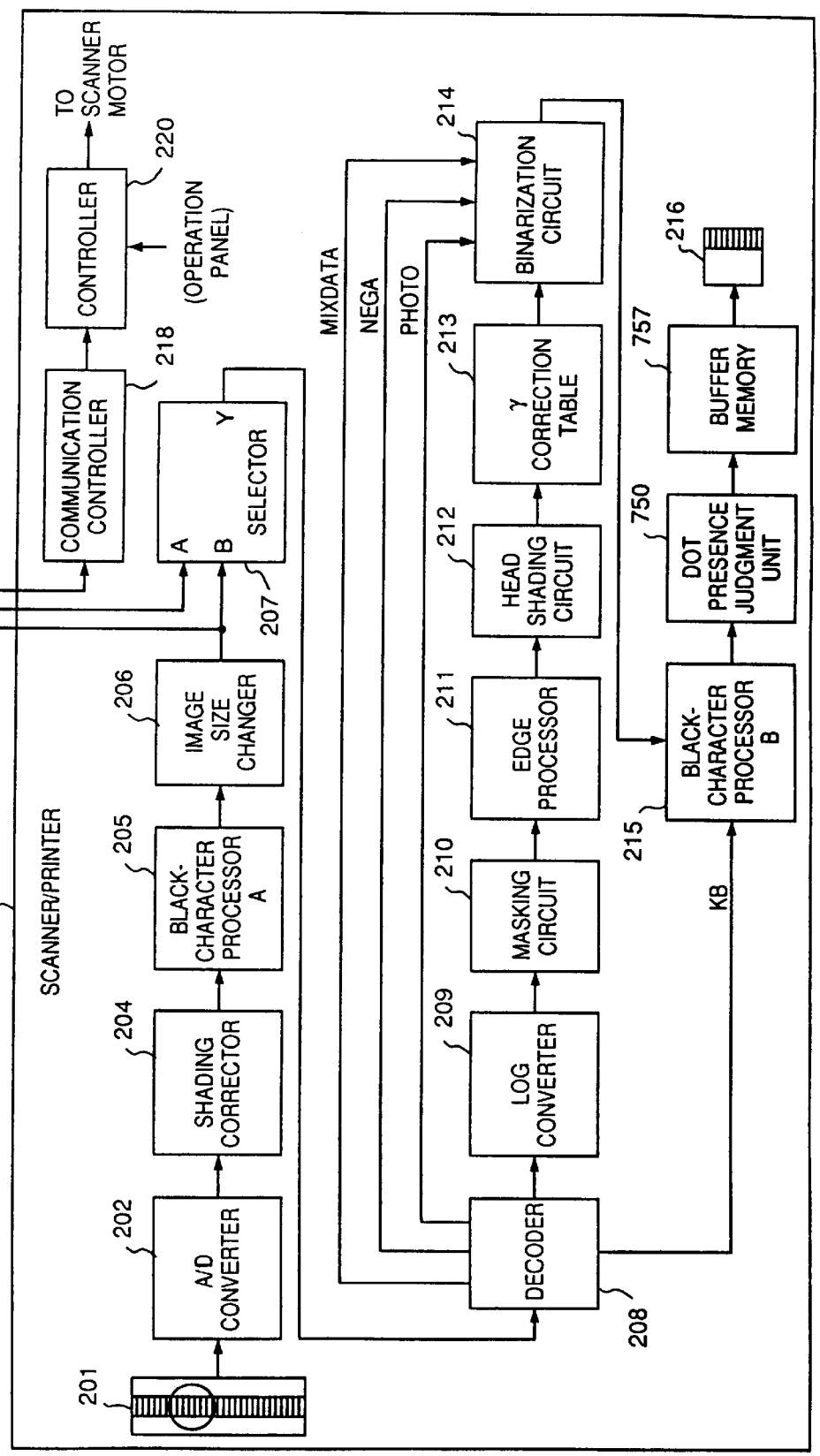
FIG. 17 is a block diagram showing the construction of a scanner/printer according to a second embodiment of the present invention.

FIG. 17 is a block diagram showing the construction of a scanner/printer 101a according to a second embodiment of the present invention. In FIG. 17, the elements corresponding to those in FIG. 2 have the same reference numerals and the explanations of those elements will be omitted. In the second embodiment, the dot presence judgment unit 750 is provided next to the black-character processor B (215), further, in place of the timing control FIFO memory 739 in FIG. 7, a buffer memory 757 is used for judgment of presence of dot data in the same manner as that of the first embodiment.

Compared with the first embodiment, the second embodiment raises the speed of calculation processing by the dot presence judgment unit 750 and lowers manufacturing cost of the circuit. This is because that the dot presence judgment unit 750 of the first embodiment inputs multi-level data (respectively 8-bit R, G, B data) to perform dot presence judgment, while the dot presence judgment unit 750 of the second embodiment inputs binary image data to perform dot presence judgment. This construction of the second embodiment is effective as a page printer for PDL data.

[Third Embodiment]

In the third embodiment, the dot presence judgment unit 750 is provided at the same position as that in the first embodiment. Information indicative of the presence/absence of dot data, as judgment result with respect to image data for one band, is registered in a table corresponding to the band. In the following output processing, whether or not the band-unit image data includes dot data is determined with reference to the table. If the band image data includes dot data, the band image data is outputted for the corresponding band, while if the band image data does not include dot data, only paper feeding operation is performed by communication control. This construction omits complicated writing control to the timing control FIFO memory 739 (FIG. 7).

Figure 18:
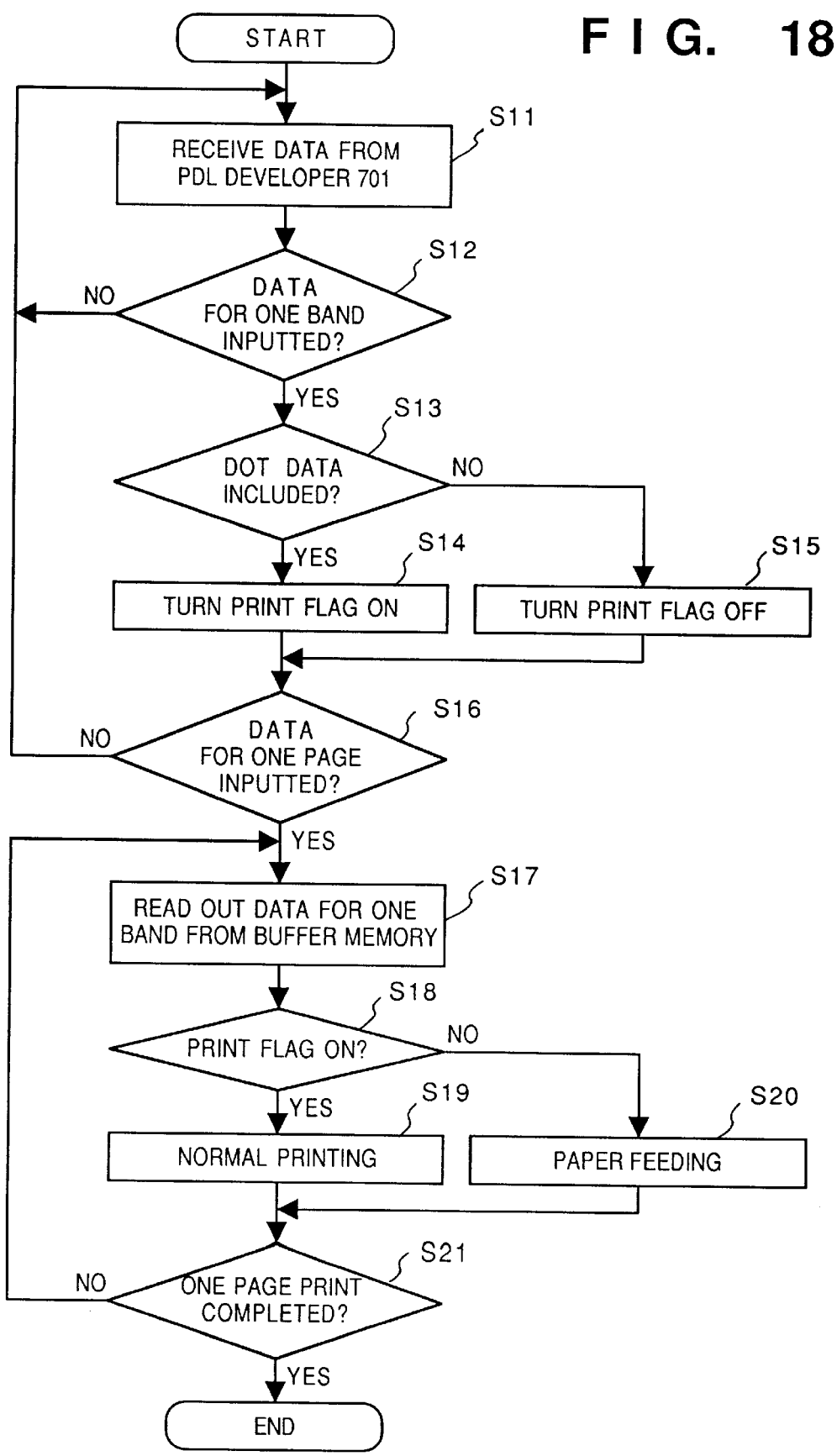
FIG. 18 is a flowchart showing a third embodiment of the present invention.

FIG. 18 is a flowchart showing the operation according to the third embodiment. Similar to steps S1 and S2 in FIG. 16, in steps S11 and S12, print data for one band is received from the PDL developer 701 and the received data is stored in the buffer memory 757. If the band data includes dot data, the process proceeds to step S14 to turn a flag corresponding to the band on. If all the values of the band data are "0", the process proceeds to step S15 to turn the flag corresponding to the band off. Note that the RAM 733 has this flag.

As the print data for one page has been stored into the buffer memory 757, the process proceeds from step S16 to step S17 to start printing. In step S17, print data for one band is read out of the buffer memory 757, and in step S18, whether or not the flag corresponding to the band is on, i.e., whether or not the band data includes dot data is determined. If the flag is on (dot data is included), the process proceeds to step S19 to perform normal printing, while if the flag is off (no dot data is included), the process proceeds to step S20, in which only paper feeding operation is instructed, and the print data for the band is invalidated. Then the process proceeds to step S21, to repeat the above operations until the printing for one page is completed.

The present invention can be applied to a system constituted by a plurality of devices, or to an apparatus comprising a single device. Furthermore, the invention is applicable also to a case where the object of the invention is attained by supplying a program to a system or apparatus.

As described above, according to the present invention, the presence/absence of dot data in image data developed from PDL data is judged, and if the data includes no dot data, only paper feeding is performed at the segment corresponding to the image data, and segments corresponding to image data including dot data are printed. This reduces printing time, further enables efficient printing when outputting image data for a plurality of pages.

The present invention is not limited to the above embodiments and various changes and modifications can be made within the spirit and scope of the present invention. Therefore, to apprise the public of the scope of the present invention, the following claims are made.

What is claimed is:

1. An image processing apparatus, comprising:

input means for inputting print data of a plurality of colors described in a page description language from an external device and for developing the print data of the plurality of colors into color image data;

print control means for scanning a printhead and for printing a color image by using the color image data in band units;

judgment means for judging whether or not the color image data developed for one band by said input means includes dot data corresponding to a dot to be printed with respect to each color; and control means for, in a case where said judgment means judges that the color image data for one band includes no dot data, controlling to omit the scanning of the printhead for the band which includes no dot data and to feed a recording medium.

2. The image processing apparatus according to claim 1, wherein said judgment means has an adder for sequentially inputting and adding the color image data, and if a data value added by the adder includes a "1", said judgment means judges that the color image data includes dot data.

3. An image processing method, comprising:

an input step of inputting print data of a plurality of colors described in a page description language from an external device and developing the print data into color image data;

a print step of scanning a printhead and printing image data in band units;

a judgment step of judging whether or not the color image data developed for one band in said input step includes dot data corresponding to a dot to be printed with respect to each color; and a print step of, in a case where it is judged in said judgment step that the color image data includes dot data, scanning the printhead and printing a color image of one band based on the color image data, after feeding a recording medium, while in a case where it is judged in said judgment step that the color image data includes no dot data, controlling to omit the scanning of the printhead for the band which includes no dot data, and feeding the recording medium.

4. The image processing method according to claim 3, wherein in a case where it is judged in said judgment step that the color image data includes no dot data, further comprising a step of:

controlling to feed the recording medium for one band at a portion corresponding to the color image data.

5. The image processing method according to claim 3, wherein said judgment step comprises a step of sequentially inputting the color image data and a step of adding the color image data, and wherein in a case where added color image data includes a "1", it is judged in said judgment step that the color image data includes dot data.

* * * * *

UNITED STATES PATENT AND TRADEMARK OFFICE
CERTIFICATE OF CORRECTION

PATENT NO. : 5,877,865

DATED : March 2, 1999

INVENTOR(S): SHIGENORI FUKUTA

It is certified that error appears in the above-identified patent and that said Letters Patent is hereby corrected as shown below:

COLUMN 1

Line 7, "The" should read --The present--.

COLUMN 4

Line 65, "printing" should read --printing of--.

COLUMN 5

Line 26, "detailed" should read --in detail--; and
    Line 48, "the" (second occurrence) should read --The--.

UNITED STATES PATENT AND TRADEMARK OFFICE
CERTIFICATE OF CORRECTION

PATENT NO. : 5,877,865

DATED : March 2, 1999

INVENTOR(S): SHIGENORI FUKUTA

It is certified that error appears in the above-identified patent and that said Letters Patent is hereby corrected as shown below:

COLUMN 7

Line 26, "processing" should read --processing is--.

Signed and Sealed this

Seventh Day of December, 1999

Attest:

Q. TODD DICKINSON

Attesting Officer

Acting Commissioner of Patents and Trademarks